US011609095B2

(12) United States Patent
Andréoli et al.

(10) Patent No.: US 11,609,095 B2
(45) Date of Patent: Mar. 21, 2023

(54) METHOD AND SYSTEM FOR ESTIMATING THE TRAJECTORY OF AN OBJECT ON A MAP

(71) Applicant: NAVER CORPORATION, Seongnam-si (KR)

(72) Inventors: Jean-Marc Andréoli, Meylan (FR); Daniel Guggenheim, Lausanne (CH)

(73) Assignee: NAVER CORPORATION, Seongnam-si (KR)

( * ) Notice: Subject to any disclaimer, the term of this patent is extended or adjusted under 35 U.S.C. 154(b) by 618 days.

(21) Appl. No.: 16/790,159

(22) Filed: Feb. 13, 2020

(65) Prior Publication Data
US 2021/0190502 A1 Jun. 24, 2021

Related U.S. Application Data

(60) Provisional application No. 62/951,100, filed on Dec. 20, 2019.

(51) Int. Cl.
*G01C 21/30* (2006.01)
*G05B 19/41* (2006.01)
(Continued)

(52) U.S. Cl.
CPC ............. *G01C 21/20* (2013.01); *G01C 21/30* (2013.01); *G05B 19/41* (2013.01); *G06T 7/20* (2013.01);
(Continued)

(58) Field of Classification Search
CPC ........ G01C 21/20; G01C 21/30; G05B 19/41; G05B 2219/39219; G05B 2219/39243;
(Continued)

(56) References Cited

U.S. PATENT DOCUMENTS
8,645,061 B2 2/2014 Newson et al.

FOREIGN PATENT DOCUMENTS
CN 107179085 A 9/2017

OTHER PUBLICATIONS

Baydin, A., et al., "Automatic Differentiation in Machine Learning: A Survey," Journal of Machine Learning Research 18, 2018, pp. 1-43.

(Continued)

*Primary Examiner* — Anne Marie Antonucci
*Assistant Examiner* — Jared C Bean
(74) *Attorney, Agent, or Firm* — Greer, Burns & Crain, Ltd.

(57) ABSTRACT

A method is disclosed for estimating a trajectory of an object on a map given a sequence of traces for the moving object. Each trace of the object including information defining a position measured at a given time for the object, as well as information as to an area of accuracy around the measured position. The method processes pairs of successive traces, corresponding to two positions successive in time in the sequence of measured positions for the moving object. For each trace of a pair of successive traces, the method defines road segments on the map within the area of accuracy of the trace. For each road segment within the area of accuracy of a first trace of a pair of traces and each road segment within the area of accuracy of the second trace of the pair, the method determines at least one candidate path between the two road segments. A neural network and a neural graph model are used to compute the most probable sequence of candidate paths to estimate the trajectory of the object on the map.

20 Claims, 8 Drawing Sheets

(51) Int. Cl.
  *G01C 21/20* (2006.01)
  *G06T 7/20* (2017.01)
(52) U.S. Cl.
  CPC ............ *G05B 2219/39219* (2013.01); *G05B 2219/39243* (2013.01); *G05B 2219/39298* (2013.01); *G06T 2207/20021* (2013.01); *G06T 2207/20084* (2013.01); *G06T 2207/20132* (2013.01); *G06T 2207/20212* (2013.01); *G06T 2207/30241* (2013.01)
(58) Field of Classification Search
  CPC ............ G05B 2219/39298; G06T 7/20; G06T 2207/20021; G06T 2207/20084; G06T 2207/20132; G06T 2207/20212; G06T 2207/30241
  See application file for complete search history.

(56) References Cited

OTHER PUBLICATIONS

Do, T., et al., "Neural Conditional Random Fields," 13th International Conference on Artificial Intelligence and Statistics (AISTATS), Chia Laguna Resort, Sardinia, Italy, 2010, pp. 177-184.

Durrett, G., et al., "Neural CRF Parsing," Proceedings of the 53rd Annual Meeting of the Association for Computational Linguistics and the 7th International Joint Conference on Natural Language Processing (vol. 1: Long Papers), Beijing, China: Association for Computational Linguistics, 2015, pp. 302-312.

Kubička, M., et al., "Dataset for Testing and Training of Map-Matching Algorithms," 2015 IEEE Intelligent Vehicles Symposium (IV), 2015, pp. 1088-1093.

Lafferty, J., et al., "Conditional Random Fields: Probabilistic Models for Segmenting and Labeling Sequence Data," University of Pennsylvania Scholarly Commons, 2001, available at https://repository.upenn.edu/cis_papers/159/, 10 pages.

Liu, X., et al., "ST-CRF Map-Matching Method for Low-Frequency Floating Car Data," IEEE Transactions on Intelligent Transportation Systems 18(5), 2017, pp. 1241-1254.

Long, C., et al., "Deep Neural Networks In Fully Connected CRF For Image Labeling With Social Network Metadata," Cornell University, ArXiv:1801.09108 [Cs], 2018, 10 pages.

Newson, P., et al., "Hidden Markov Map Matching through Noise and Sparseness," Proceedings of the 17th ACM SIGSPATIAL International Conference on Advances in Geographic Information Systems, ACM, 2009, 8 pages.

Peng, J., et al., "Conditional Neural Fields," NIPS, 2009, available at https://papers.nips.cc/paper/2009/file/e820a45f1dfc7b95282d10b6087e11c0-Paper.pdf, pp. 1-9.

Spruyt, V., "Loc2Vec: Learning Location Embeddings with Triplet-Loss Networks," Sentiance, 2018, available at http://www.sentiance.com/2018/05/03/venue-mapping/, 9 pages.

White, C., et al., "Some Map Matching Algorithms for Personal Navigation Assistants," Transportation Research Part C: Emerging Technologies 8, 2000, pp. 91-108.

Xu, M., et al., "Map Matching Based on Conditional Random Fields and Route Preference Mining for Uncertain Trajectories," Mathematical Problems in Engineering, 2015, 14 pages.

Zheng, S., et al., "Conditional Random Fields as Recurrent Neural Networks," In 2015 IEEE International Conference an Computer Vision (ICCV), Santiago, Chile, IEEE, 2015, pp. 1529-1537.

METHOD AND SYSTEM FOR ESTIMATING THE TRAJECTORY OF AN OBJECT ON A MAP

RELATED APPLICATION

The present application is a Non-Provisional of, and claims 35 USC 119 priority from, U.S. Provisional Application Ser. No. 62/951,100 filed Dec. 20, 2019, the contents of which are incorporated by reference herein.

FIELD

The present disclosure relates to offline map matching, and more particularly, to a method for estimating the trajectory of a moving object given a set of successive position measurements for the object.

BACKGROUND

Map matching includes online map matching and offline map matching, which solve different problems. In online map matching, the position of an object is constantly tracked on a map using, for example, a satellite navigation system to record sensor data. The sensor data is consulted at reasonable frequency (e.g., every second or less) and the prediction of the current position of the object is adjusted without being concerned with the rest of the trajectory. Only a small window of sensor data and trajectory estimates is stored to help estimate the current position of the object on the map.

In contrast, offline map matching involves an object recording its position (e.g., cars, buses, bikes, etc.) over an extended period, usually with a low sampling rate (e.g., from tens of seconds up to several minutes). The aim is then to reconstruct the most probable trajectory of the object using the recorded position information. The trajectories of objects thus estimated can then be displayed or used in a large spectrum of data analytics tasks, such as designing models of traffic analytics tasks for road congestion, traffic jam evolution or speed patterns.

SUMMARY

According to one aspect of the disclosed embodiments, a method estimates a trajectory of a moving object on a map, given a sequence of measured positions for the moving object. Advantageously, the method does not require handcrafting determined features, which are constructed a priori, or supervised training of feature weights, as inputs for the processing. Instead, the method is an end-to-end approach that directly learns potentials using a deep neural network on map tile images.

According to another aspect of the disclosed embodiments, the method estimates a trajectory of an object on a map by processing of a sequence of traces of the object. Each trace of the object comprising information defining a position measured at a given time for the object, as well as information as to an area of accuracy around the measured position.

According to yet another aspect of the disclosed embodiments, the method processes a plurality of pairs of successive traces, each pair of successive traces comprising a first trace and a second trace corresponding to two positions successive in time in the sequence of traces of the object. For each trace of a pair of successive traces, the method defines road segments on the map within an area of accuracy of the trace.

For each road segment within the area of accuracy of a first trace of a pair of traces and each road segment within the area of accuracy of the second trace of the pair, the method determines at least one candidate path between the two road segments.

For each candidate path, the map is processed to generate an image of the path, where the image is superimposable on a predetermined tile. The image is input to a neural network, such as a convolutional neural network (CNN), for computing a score associated with the candidate path. The method also includes applying a conditional random field (CRF) model to the scores computed for the various candidate paths of all the tiles to determine the most probable sequence of candidate paths. Further, the method estimates the trajectory of the object on the map with the most probable sequence of candidate paths of the plurality of pairs of successive traces.

Additionally, the image input to the neural network is previously scaled, cropped and rotated to have the same dimensions and the same orientation as the tile on the map to which it is superimposable.

In one embodiment, an image input to the neural network comprises a 2D image matrix of pixels defining a 2D image of the path, as well as two other matrices respectively providing for each pixel of the 2D image matrix the distance of the pixel respectively to the first and second traces of the pair of traces to which the path corresponds.

In addition, traces are determined beforehand from a sequence of successive measured positions and wherein, in the absence of information as to an area of accuracy of at least one measured position, a predetermined accuracy radius is used to define an area of accuracy for the position.

The method may be used for estimating a trajectory of an object on a map of road network, wherein the sequence of traces corresponds to successive positions measured by a sensor attached to the object during a trip of the object.

In accordance with the disclosed embodiments, a method estimates a trajectory of an object on a map. A sequence of traces of the object on the map is received; each trace in the sequence of traces defining (i) a position measured at a given time for the object on the map, and (ii) accuracy information that defines a measure of accuracy of the measured position on the map. Successive traces in the sequence of traces are paired; each pair of successive traces comprising a first trace and a second trace corresponding to two successive positions in time in the sequence of traces. An area of accuracy on the map is defined using the accuracy information of the first trace and the second trace of each pair of successive traces. The map is segmented into tiles that includes the area of accuracy of the first trace and the second trace of each pair of successive traces. A set of road segments is determined within the areas of accuracy of each pair of successive traces in the sequence of traces. For each segmented tile associated with each pair of successive traces in the sequence of traces, (i) a set of images representing a set of candidate paths of the object within the segmented tile is computed; each candidate path in a set of candidate paths defining a different combination of road segments within the segmented tile; and (ii) a neural network is used to compute a set of local path scores representing a path score for each image in the set of images. A sequence of sets of local path scores is defined with the set of local path scores computed for each segmented tile associated with each pair of successive traces in the sequence of traces. A neural graph model is applied to the sequence of sets of local path scores to determine a most probable sequence of candidate paths that estimates the trajectory of the object on the map. A sequence of sets of images with the set of images computed for each segmented tile associated with each pair of successive traces in the sequence of traces is defined. The images from the sequence of set of images defining the most probable sequence of candidate paths are output According to a complementary aspect, the present disclosure provides a computer program product, comprising code instructions to execute a method according to the previously described aspects for offline map matching; and a computer-readable medium, on which is stored a computer program product comprising code instructions for offline map matching.

DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

System Architecture

Figure 1:
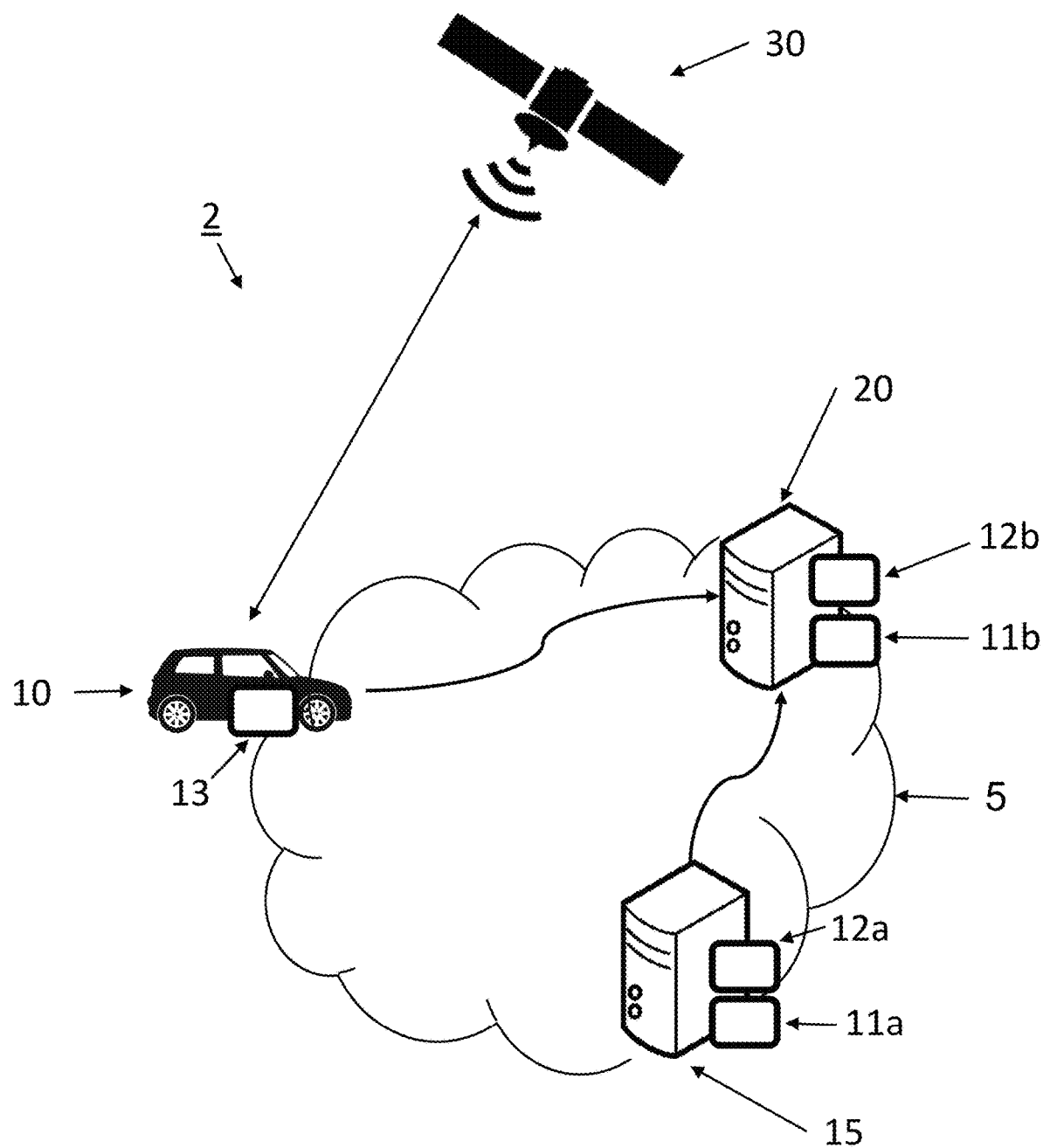
FIG. 1 illustrates an example of a system architecture in which the offline map matching method according to the present disclosure may be performed.

The offline map matching method disclosed hereunder may be implemented within a system 2 architected as illustrated in FIG. 1, which comprises two servers 15 and 20 and a moving object 10, typically a vehicle, geo-located by a positioning system 30 using positioning device 13 on the object 10. Servers 15 and 20 and device 13 communicate over a network 5 (which may be wireless and/or wired) such as the Internet for data exchange. Each server 15 and 20 includes a data processor (11a, and 11b, respectively) and memory (12a, and 12b, respectively) such as a hard disk.

The server 15 is a map server, which may be for example an external service accessible by an application programming interface (API) such as Open Street Map.

The server 20 is the trajectory estimation server that uses data relative to moving object 10 received from the moving object at a given frequency and map data from map server 15 to estimate the trajectory of moving object 10.

The trajectory of the object 10 is estimated as it moves using a sensor attached or embedded in the object 10 with a positioning device 13 that communicates with positioning system 30 over an extended period, usually with a low sampling rate.

In one embodiment, the offline map matching method disclosed hereunder operates on server 20 of system 2. In another embodiment, it is noted that the two servers 15 and 20 may be merged. In yet another embodiment, the functionality of the two servers 15 and 20 may be merged into a standalone positioning device 13.

Figure 2:
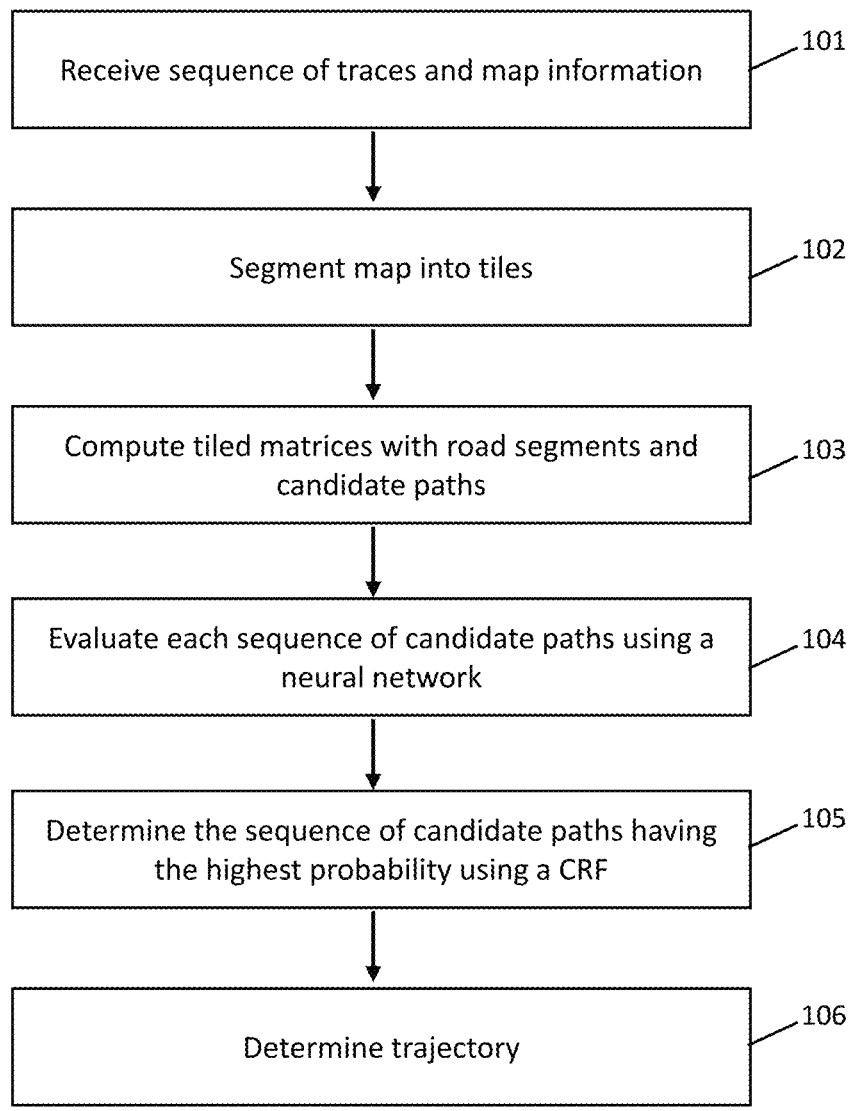
FIG. 2 sets forth an offline map matching method according to the present disclosure.
Figure 3:
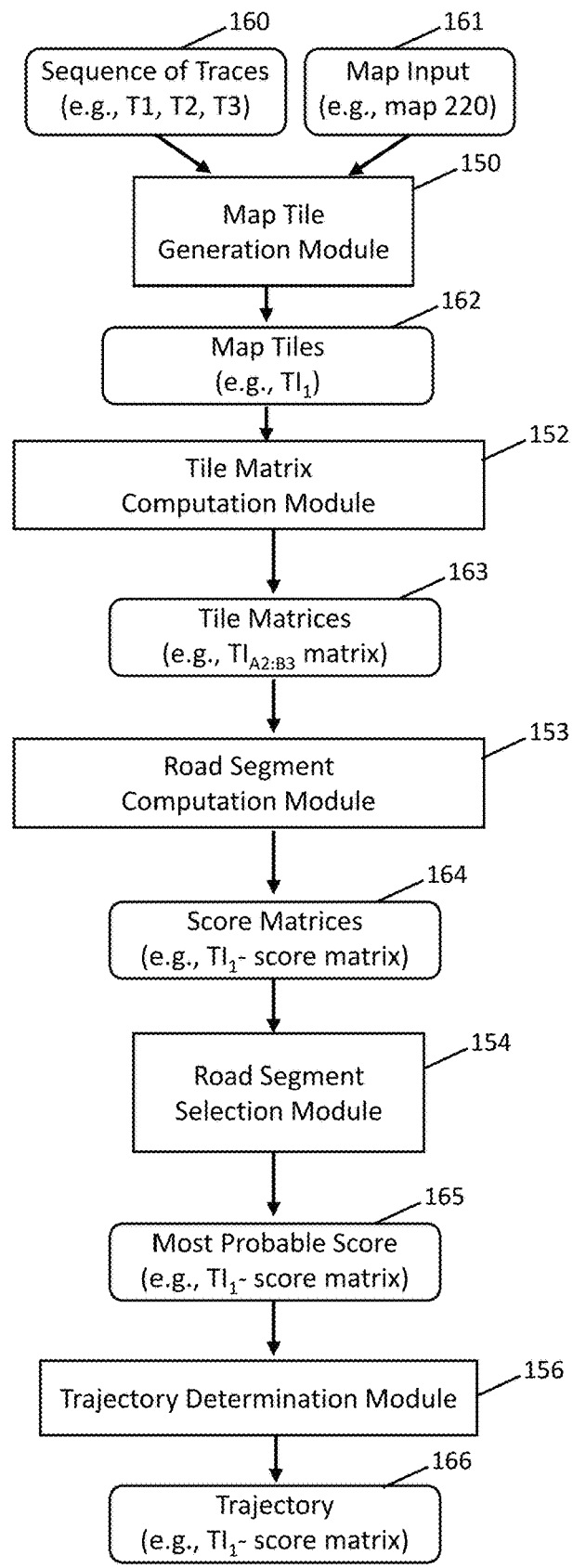
FIG. 3 illustrates the workflow of modules of trajectory estimation server 20 shown in FIG. 1 operating in accordance with the method set forth in FIG. 2.

With reference to the offline map matching method set forth in FIG. 2 and the modules of the trajectory estimation server 20 shown in FIG. 3, map tile generation module 150 receives at 101 a sequence of traces 160 of an object and map information 161 as inputs. At 102, the map information 161 is segmented into tiles 162 by the map tile generation module 150, with each segmented tile containing pairs of consecutive traces of the sequence of traces.

At 103, tile matrices 163 are computed with road segments and candidate paths associated with each pair of consecutive traces by tile matrix computation module 152.

At 104, each possible sequence of candidate paths is evaluated using a neural network by road segment computation module 153 to produce score matrices 164. At 105, the sequence of candidate paths from the score matrices determined at 104 with the most probable score 165 is determined using a CRF (Conditional Random Field) by road segment selection module 154.

At 106, the most probable sequence of road segments is assembled by trajectory determination module 156 using the most probable scores 165 to define a trajectory 166 of the object. In addition, at 106, the trajectory 166 is output for display or further processing such as a data analytics task.

Sequence of Traces

As used in the disclosed embodiments, a trace is to be understood as a position of an object measured by a positioning system (forming part of a sensor attached to or integrated with the object), at a given time, together with an area of accuracy defined around the measured position of the object. The area of accuracy is defined by an accuracy distance, such as a radius from a specified location to define an area of accuracy in the shape of a disk.

The time of each measured trace is that of a timestamp associated to the coordinates of the measured position of the object by the sensor. The coordinates output by the sensor may be in the form of latitude-longitude data, obtained through a positioning system (such as a satellite global positioning (GPS) system, or cellular locating system that uses WIFI-based or SIM-based methods, or a combination of such systems) or any other system allowing determination of the position of an object at a given time.

The accuracy distance of a measured position is an additional information which characterizes the confidence in the estimate of the coordinates. It is often available from GPS devices themselves as a radius distance specifying a disk area around the estimated point within which the device is confident the real point lies.

While the theoretical accuracy of GPS devices may be as low as a few meters in perfect conditions, several perturbation factors may alter it: sub-optimal alignment of the satellites, partial loss of signal due to surrounding obstacles, atmospheric effects, multipath effects (esp. in "city canyons"), etc.

Accuracy may vary along the sequence of traces since the conditions of the measurement may change. In most cases, when this information is not available, a pessimistic default global value is applied (e.g., a disk area given by 300 m radius from the estimated position of a trace).

A sequence of traces, such as sequence of traces T1, T2, and T3, is a succession of traces of an object, ordered by their time stamps.

Map Information

Map information may be obtained as needed from a given server (e.g., server 15), such as provided by the Open Street Map (OSM) project, or a local storage device.

For a given sequence of traces, the map information describes a map that encompasses the sequence of traces and road network within the area of accuracy of each trace point, as well as between consecutive areas of accuracy.

The map information includes minimal descriptors, for example, the position and shape of road segments, which may be described using the OSM convention as a set of nodes positioned in space and a set of straight-line edges between these nodes. A variety of meta data tags (e.g., type/size of roads, speed limits, etc.) may be added to enrich the minimal descriptors, which may be described as formalized in the OSM recommendations to contributors.

Map Tiles

The map for a given sequence of traces is provided to a tile generator (e.g., tile generator 150) which segments the map into tiles 162.

The tiles are computed so that each tile contains a pair of consecutive traces of a sequence of traces. As used in describing the embodiments, the term consecutive means two traces corresponding to two measures successive in time.

All the tiles also include the areas of accuracy of the measured positions corresponding to the pair of consecutive traces. Accordingly, each pair of consecutive traces of the sequence of traces is contained in a tile, together with their corresponding areas of accuracy.

It will be readily understood that the tiles overlap and include one trace from the preceding tile in the sequence and one trace from the following tile in the sequence (see the example shown in FIG. 5 and described below).

Road Segments and Candidate Paths

Figure 4:
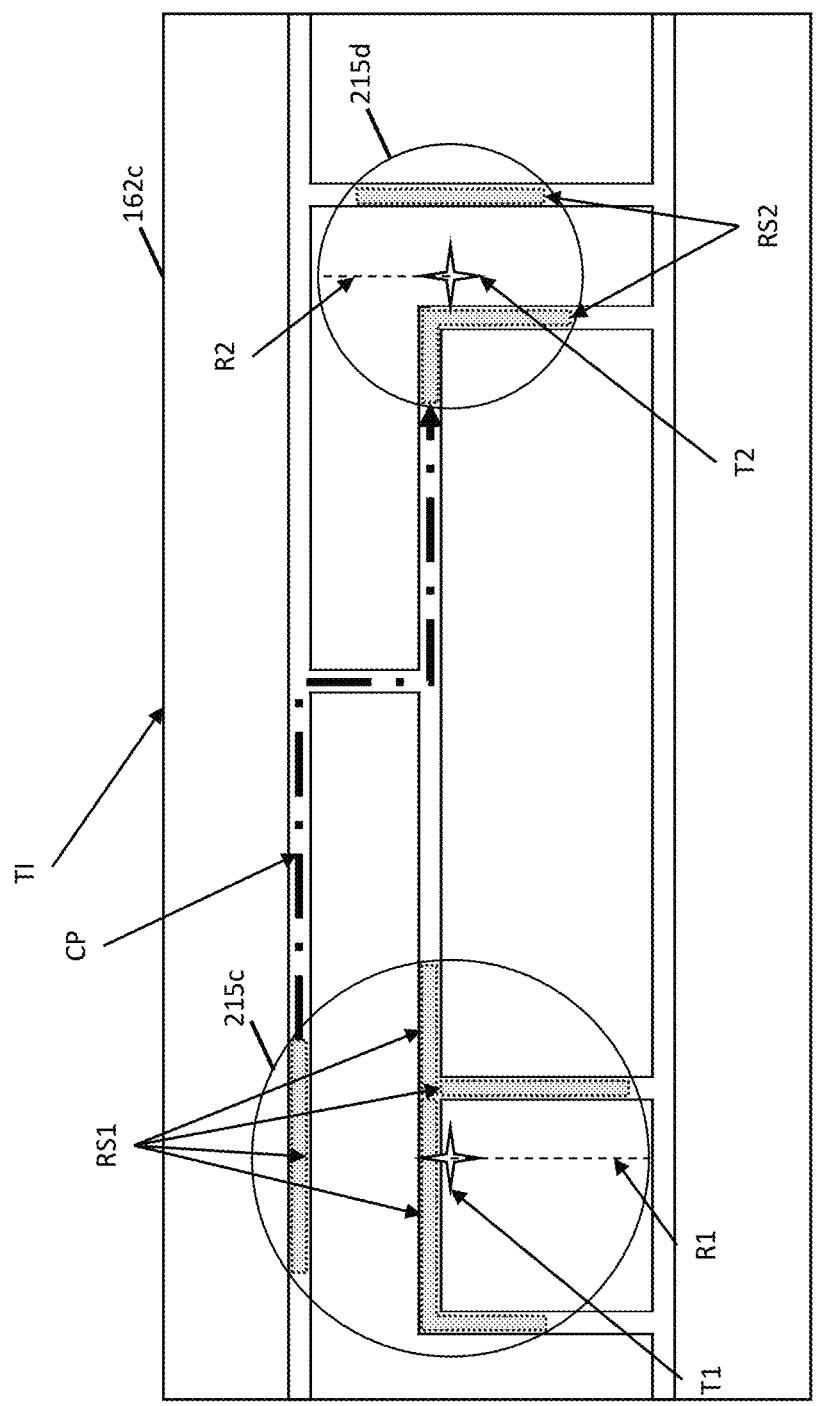
FIG. 4 illustrates an example of a pair of consecutive traces, with their associated road segments.

FIG. 4 illustrates an example pair of consecutive traces (T1, T2) on the same tile TI or 162c with their respective accuracy radius R1 and R2 that are used to define areas of accuracy 215c and 215d for the pair of traces (T1, T2), respectively. In alternate embodiments, areas of accuracy other than disks corresponding to traces T1 and T2, respectively, such as squares may be computed using respective measures of accuracy, radius R1 and R2.

Each trace (e.g., T1, T2) within a tile 162 (e.g., TI) may be associated with a set of (one or more) road segments (e.g., referred to as RS1 for trace T1 and as RS2 for trace T2). These sets of road segments RS1 and RS2 are associated with the two consecutive traces T1 and T2, respectively (even if the measured position of the considered trace is not exactly on one of the road segments).

Two sets of road segments RS1 and RS2 of the two consecutive traces T1 and T2, respectively, are joined by at least one candidate path CP.

The method computes candidate paths (e.g., CP) between road segments in each set of road segments (e.g., (RS1, RS2)) determined for two consecutive traces (e.g., T1 and T2) in a tile 162 (e.g., TI). These paths are then computed as hereunder explained.

Further, given a pair of consecutive traces (e.g., T1 and T2), the same image zoom level is used to represent all the possible pairs of road segments, to give structural consistency between images representing different candidate paths associated with different map tiles. The zoom value is chosen so that all the sets of road segments (e.g., RS1 and RS2) are visible in the tile, and at a minimum distance (10% of the tile width) of any border of the tile.

Figure 5:
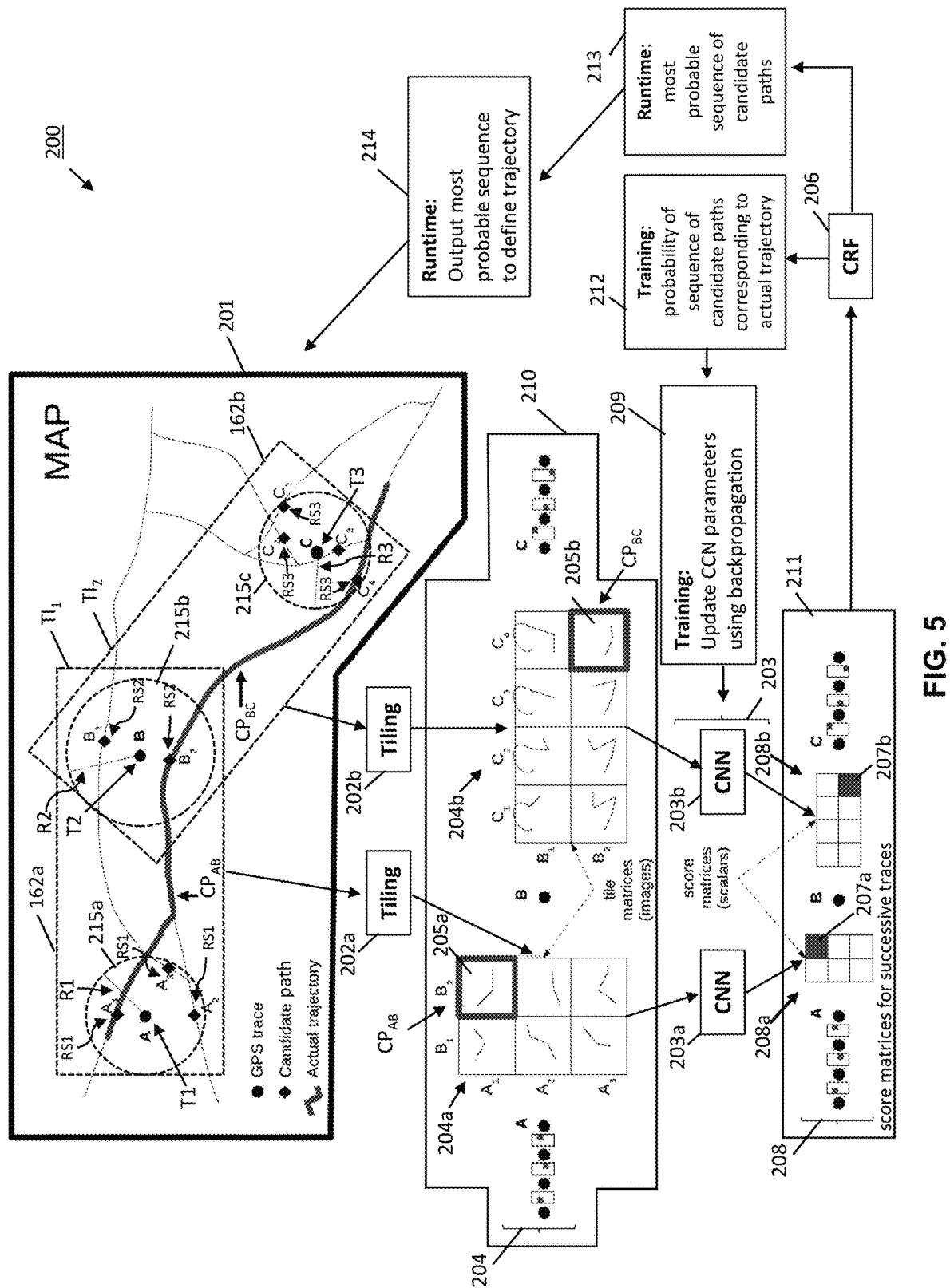
FIG. 5 illustrates an example of an implementation of the method illustrated in FIG. 2.

FIG. 5 illustrates an example of an implementation 200 of the method illustrated in FIG. 2. FIG. 5 illustrates two consecutive pairs of traces (T1, T2) and (T2, T3) on respective tiles 162a ($TI_1$) and 162b ($TI_2$). Generally for each tile $TI_N$, the method computes a set of candidate paths $CP_{N,N+1}$ between a pair of road segment sets (RS(N), RS(N+1)) determined for consecutive traces T(N) and T(N+1).

As illustrated in FIG. 5, each road segment in the set of road segments RS1, RS2 and RS3 is associated with a trace T1, T2 and T3, and an accuracy radius R1, R2, and R3, to define areas of accuracy 215a, 215b, and 215c, respectively. More specifically, each trace T1, T2 and T3 may include one or more road segments in their respective set of road segments RS1, RS2, and RS3 within their respective areas of accuracy 215a, 215b, and 215c (e.g., for area of accuracy 215a trace T1 road segments RS1-A1, RS1-A2, and RS1-A3 are in the road segments set RS1).

Each pair of consecutive road segments (e.g., pairs of road segment sets (RS1, RS2) and (RS2, RS3), which are associated with respective consecutive pairs of traces (T1, T2) and (T2, T3)) is joined by at least one candidate path in a set of candidate paths (e.g., the set of candidate paths $CP_{AB}$ is associated with road segment sets (RS1, RS2) of tile $TI_1$).

Referring again to FIG. 5, for each candidate path in the set of candidate paths between the two consecutive traces (e.g., set of candidate paths $CP_{AB}$ of trace pair ($T_1$, $T_2$) of tile $TI_1$), each tile of the map 201 is processed at 202 to generate a 2D (i.e., two-dimensional) image matrix (e.g., for tile 162a ($TI_1$) and 162b ($TI_2$) of map 201, 2D image matrix 204a and 204b associated with the set of candidate paths $CP_{AB}$ and $CP_{BC}$, respectively), where each 2D image map 205 in each 2D image matrix 204 (e.g., image 205a in matrix 204a and image 205b in matrix 204b) includes a candidate path that is superimposable on its corresponding tile (e.g., tile $TI_1$) of the map 201. Each 2D image map 205 in the image matrix 204 is a simplified image which comprises data corresponding to the outline of the selected candidate path (e.g., the candidate path ($A_3,B_2$) from the set of candidate paths $CP_{AB}$) that is superimposable on its corresponding tile 162 (e.g., tile 162a or $TI_1$) of the map 201.

More generally, when tiling at 202 for map 201, a set of 2D image maps 204 (e.g., image matrix 204a) is computed for successive traces TN-TN+1 (e.g., T1-T2) corresponding to tile 162 ($TI_n$) on map 201 (e.g., 2D image matrix 204a is computed for tile 162a ($TI_1$)), producing a sequence 210 of sets of 2D image maps 204 for successive tiles 162 ($TI$-$TI_{n+1}$) on map 201.

In order to have the same dimensions and the same orientation as each tile 162 (e.g., $TI_1$) to which a 2D image map 205 (e.g., image map 205a) of a candidate path (e.g., candidate paths $CP_{AB}$) is superimposable, the processing of the 2D image map may require: rotating the 2D image map to have the same orientation as its corresponding tile TI; and/or cropping the 2D image map to remove the parts of the 2D image map that lie outside its corresponding tile TI; and/or scaling the cropped image to resize the 2D image map so that it has the same resolution as its corresponding tile TI.

The data of each 2D image map 205 that corresponds to the outline of a candidate path may be represented using a sequence of contiguous line segments, one for each road segment.

To indicate the direction taken by the moving object associated with traces T on each line segment, an intensity gradient may be added to the 2D image map along the candidate path (i.e., the path determined by the system to be the estimated trajectory of the object associated with traces T), with the direction of the moving object being indicated by the direction of positive gradient. Using a visual metaphor, a candidate path may be made "brighter" towards its end point using the intensity gradient.

More generally, each image map 205 that may be superimposed on a corresponding tile 162 may be defined using a multichannel image that comprises data in the form of complementary channels. The channels of each multichannel image may be represented as a plurality of matrices of pixel values, one for each channel, and the channels each corresponding to a particular property.

In one embodiment, the first channel of the multichannel image is the superimposable 2D image map, and a second and a third channel may contain, for each pixel of the superimposable 2D image map, its distance (pixel-wise) to the pixel where trace t−1 and t respectively lies, where t−1 and t are two consecutive time stamps. When present, this information may be used by the convolutional neural network (CNN) of the trajectory estimation system as a global location indication.

In other embodiments, other or additional channels may be added to the multichannel image, such as a channel representing the speed limit of the road segments as a scalar value for each pixel representing a road segment.

Object Trajectory

Referring again to FIG. 5, once computed, the 2D image matrix 204 (e.g., matrix 204a), or more generally matrix of multichannel images, is input to a convolutional neural network (e.g., CNN 203), the output of which is used as a scoring function (also called a feature function) of a conditional random field (e.g., CRF 206) model to produce a score matrix (e.g., matrix 208) to determine a score associated with each candidate path in the set of candidate paths (e.g., $CP_{AB}$).

For each pair of consecutive traces (e.g., pair (T1, T2)), a set of road segments (e.g., set of road segments RS1 includes road segments RS1-A1, RS1-A2, and RS1-A3 and set of road segments RS2 includes road segments RS2-B1 and RS2-B2) is proposed, and from which a set of candidate paths $CP_{AB}$ is computed. Then, a score for each candidate path in a 2D image matrix is computed using a convolutional neural network to define a score matrix (e.g., CNN 203a takes as input 2D image matrix 204a to compute score (or scalar) matrix 208a).

The output of the scoring function of the convolutional neural network at 203 for successive traces TN-TN+1 produces a sequence 211 of set of local path scores from each corresponding set of 2D images (e.g., score matrix 208a corresponding to 2D image matrix 204a for successive traces T1-T2). At 213 during runtime, the sequence 211 of sets of local path scores 208 is used by a neural CRF model (e.g., CRF 206) to determine the most probable sequence of candidate paths to estimate the trajectory of a moving object on a map. At 214, 2D images are output from the sequence 210 of sets of 2D images 204 corresponding those in the sequence 211 of sets local paths scores 208 defining the most probable sequence of candidate paths (or road segments) of the trajectory on the map 201. Alternatively, at 212 during training, the sequence 211 of sets of local path scores 208 is used by the neural CRF model (e.g., CRF 206) to determine the probability of the sequence of candidate paths corresponding to the actual trajectory to update at 209 parameters of the convolutional neural network 203 through backpropagation.

Neural Graph Model

Conditional random fields (CRF) is a neural graph model that provides a method for predicting an outcome over a sequence of inputs. More specifically, a CRF is used to model a random variable X ranging over a set Y of structured objects (called configurations), using a scoring function ψ: Y ↦ R, where R is a set of scalars. Other terminologies exist: the opposite of the score is called the energy of the configuration, the exponential of the score is called its potential. The scoring function ψ may be expressed as a sequence of candidate scores $x_t$ and local scoring functions $\Psi_t$ for each candidate score as follows:

$$\psi(x) = \Sigma_{t=2}^{T}(\Psi_t) x_{t-1} x_t$$

Figure 6:
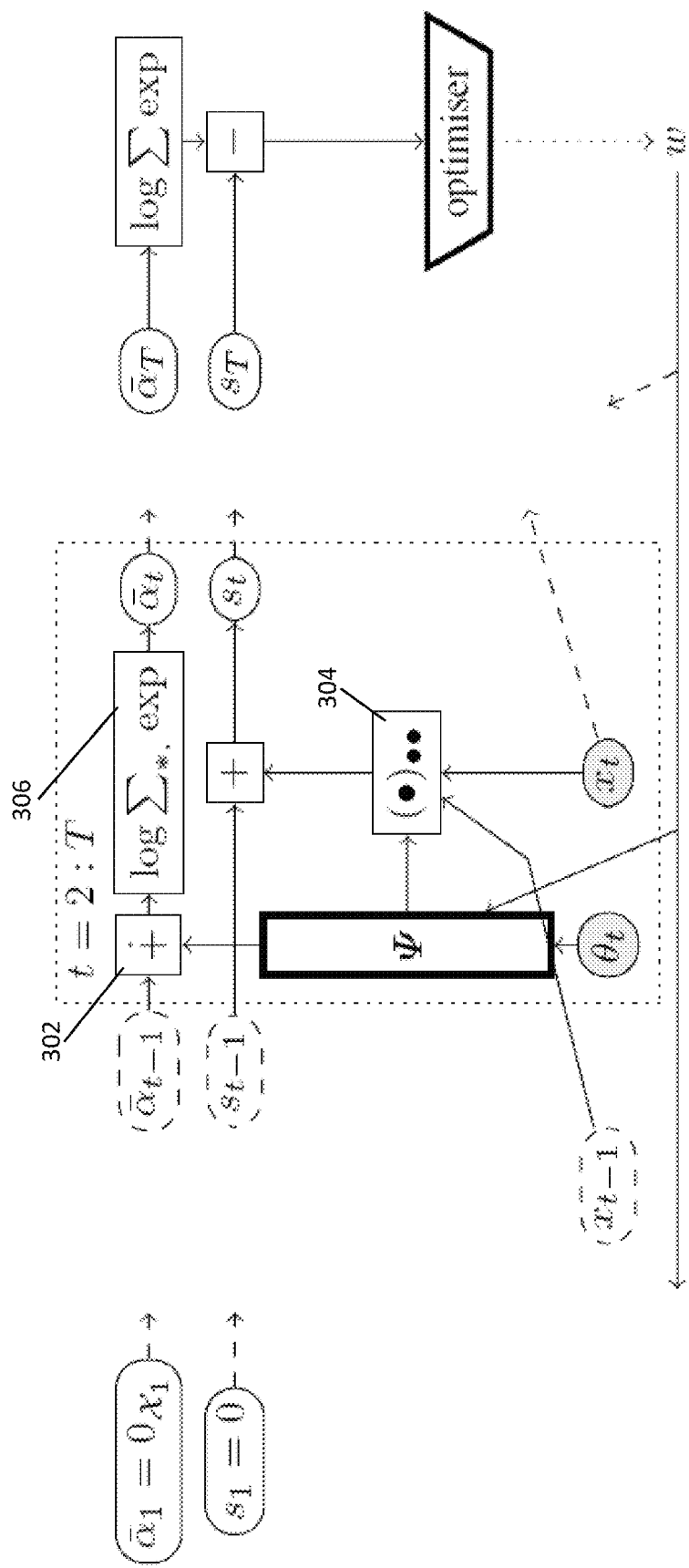
FIG. 6 illustrate an example of neural graph model architecture.
Figure 7:
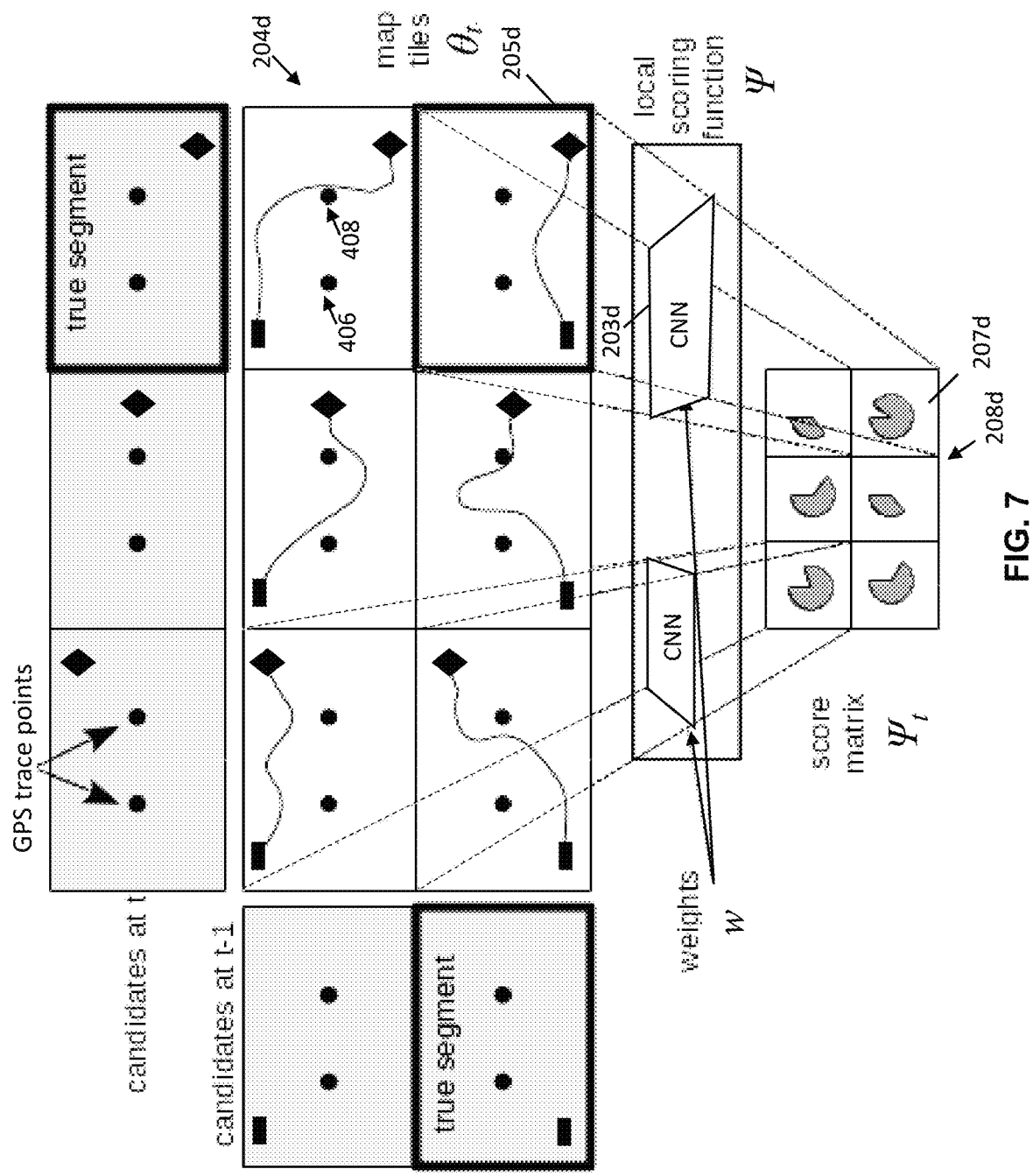
FIG. 7 illustrates a local scoring function of neural map matching.

FIG. 6 illustrates an example of neural graph model architecture for performing the method shown in FIG. 2. In one embodiment, the neural graph model is a conditional random field (CRF). In alternate embodiments, the neural graph model may be a graph convolutional network (GCN). As shown in FIG. 6, the local scoring function Ψ is a neural network, which uses images as input data $\theta_t$. In one embodiment, the neural network is computed using a convolutional neural network as shown in FIG. 7. The local scoring function Ψ is a highly non-linear parametric local scoring function and does not rely on hand-crafted features, allowing end-to-end learning. Thus, as shown in FIG. 7, which illustrates a local scoring function Ψ of neural map matching, instead of inputting a vector of hand-crafted features computed from the map 201, the local scoring function Ψ scores consecutive pairs of traces (e.g., consecutive pairs of traces (T1, T2) on tile 162a TI$_1$ in FIG. 5), by taking as input data $\theta_t$, a 2D image matrix 204 determined from map tiles 162 (e.g., matrix 204a shown in FIG. 5), and producing as output local score matrix $\Psi_t$.

In the embodiment shown in FIG. 7, 2D image maps in 2D image matrix 204d associated with the tile images for one pair of consecutive road segments represent the most likely path between the two road segments. In an alternate embodiment, the top-k most likely paths are represented.

Further in the embodiment shown in FIG. 7, 2D image maps in 2D image matrix 204d represent the position of the two consecutive traces (e.g., traces 406 and 408 of 2D image map 205d) using the following convention: the 2D image map is rotated and zoomed in such a way that the two consecutive traces are always on the horizontal middle axis of a tile, at fixed symmetric positions on each side of the center, where the earlier trace of the pair is positioned on the left-hand side and the later trace the right-hand side of the center.

As shown in FIG. 7, the local scoring function is also provided with weights w which are parameters of a neural network, which in one embodiment is a convolutional neural network (CNN) 203. The architecture of the neural network is adapted to the dimensions of the simplified images present in $\theta_t$, and is assumed to have a single scalar output (dimension 0), local score matrix $\Psi_t$. The output local score matrix $\Psi_t$ of local scoring function Ψ is the result of applying the neural network parametrized by weights w to each of the images in array $\theta_t$. The weights w of local score matrix $\Psi_t$ are trained (i.e., updated) using backpropagation as shown at 214 in FIG. 5.

Since the neural network 203 has a single scalar output, the result is, as expected, a matrix of scalar values 208 scoring each possible pair of road segments in tile matrix 204 (e.g., image map 205d in tile matrix 204d has corresponding scalar value 207d in scalar matrix 208d computed by CNN 203d).

Figure 8:
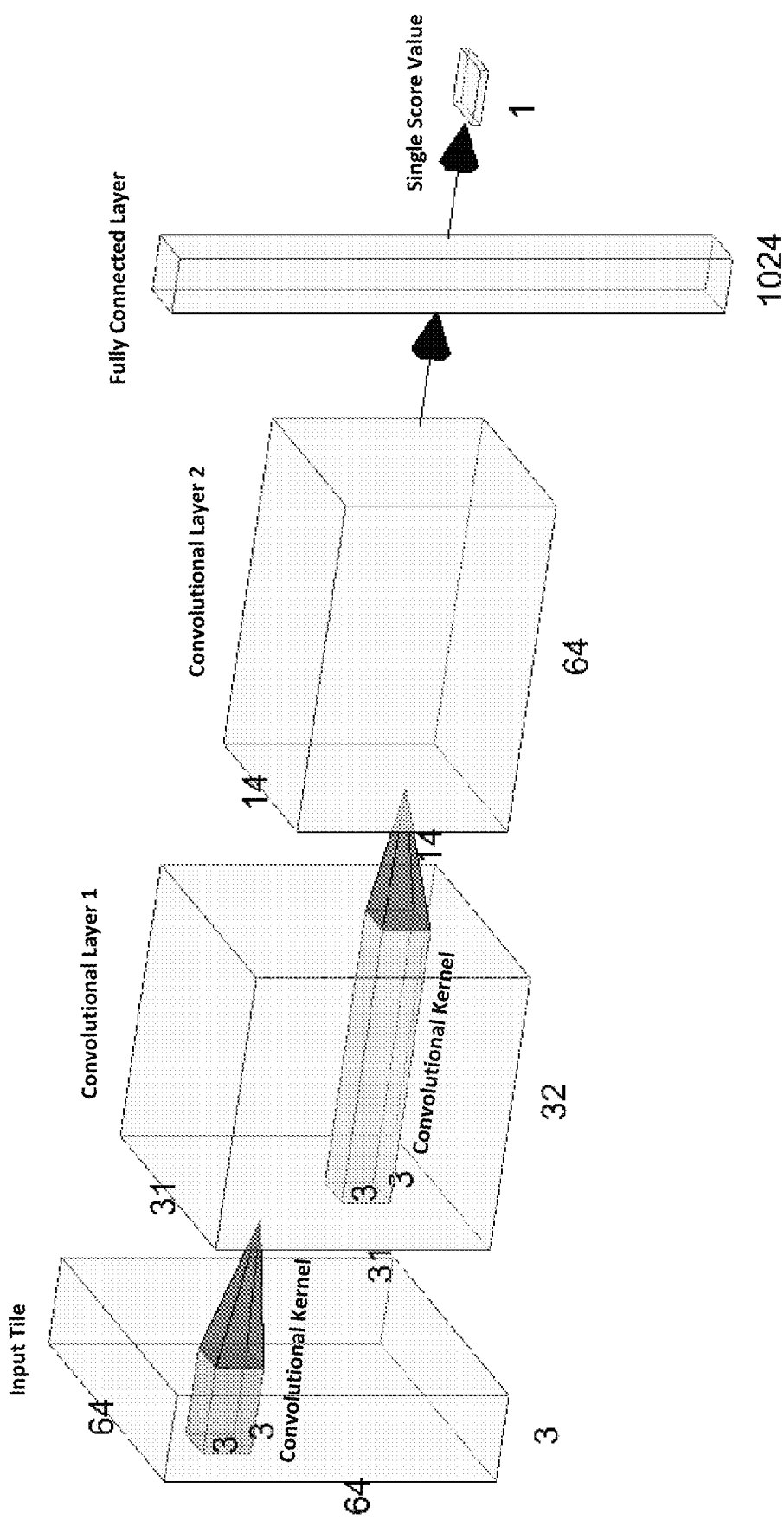
FIG. 8 illustrates scoring convolutional network structure for an input tile.

FIG. 8 shows an example embodiment of a neural network that may be used as a scoring convolutional network structure for an input tile (which corresponds to an image map 205). More specifically, FIG. 8 shows 3×3 convolutional kernels, and no stride (i.e., a distance of one between spatial locations where the convolution kernel is applied). The scoring structure for the convolutional neural network in FIG. 8 for a 64×64×3 input tile includes: two convolutional layers of 32 and 64 filters respectively, with max-pooling (not shown) and, at the end, a fully connected layer of 1024 units which produces a single score value. All layers are terminated by a ReLU (Rectifier Linear Unit) activation function that produces a zero as an output when the input is less than zero, and then produces a linear with slope of one when the input is greater than zero. The network weight parameters are iteratively learned using the Adam optimization algorithm published by Diederik P. Kingma and Jimmy Lei Ba in "Adam: A method for stochastic optimization", published in 3rd International Conference for Learning Representations, San Diego, 2015.

On the other hand, any neural network designed for feature extraction can also be used with at least one layer added, for example, a fully connected layer, on the feature output, to compute a single score value.

Referring again to FIG. 6, a CRF method is applied using the score computed by the CNN shown in FIG. 8 for each candidate path and every pair of consecutive traces from the sequence of traces in order to compute the most probable path score in the set of computed path scores in local score matrix $\Psi_t$ (as shown in FIG. 7). As shown in FIG. 6, operator 302 adds a vector to a matrix column-wise and operator 304 extracts one cell of a matrix at a given row and column. Operator 306 applies log Σ exp to each column of a matrix and returns a vector.

Learning in the neural CRF model shown in FIG. 6 requires the following equation to be put in the form of a symbolic expression adapted to automatic differentiation (i.e., a neural network):

$$\log Z(\Psi_{2:T}) = \log \sum_{x \in X_T} \exp(\bar{\alpha}_T)_x, \begin{cases} (\bar{\alpha}_t)_{x'} = \log \sum_{x \in X_{t-1}} \exp((\bar{\alpha}_{t-1})_x + (\Psi_t)_{xx'}) \\ (\bar{\alpha}_1)_x = 0 \end{cases},$$

where $\bar{\alpha}_t$ denotes the log of the $X_t$-dimensional vector traditionally denoted by $\alpha_t$), which may be computed using a dynamic programming procedure known as the "alpha" phase of the alpha-beta algorithm (a special case of the sum-products algorithm).

The local scoring function $\Psi$ shown in FIG. 6 is expressed as the convolutional neural network as shown in FIG. 8, which amounts to embedding it within a recurrent layer. The output of recurrent cell t, computed from that of cell t−1 and the input data at t, consists of: the $X_t$-dimensional vector $\bar{\alpha}_t$ needed for the computation of the log Z term in the following equation:

$$w^* = \underset{w}{\operatorname{argmin}} \sum_{r \in R} \left( -\sum_{t=2}^{T^{(r)}} \Psi(\theta_t^{(r)}, w)_{x_{t-1}^{(r)} x_t^{(r)}} + \log Z(\Psi(\theta_t^{(r)}, w)_{t \in 2:T^{(r)}}) \right),$$

and the scalar $s_t$ defined as the partial sum:

$$s_t = \sum_{u=2}^{t} (\Psi_u)_{x_{u-1} x_u},$$

which is needed to compute its first term; and
where the ground truth label $x_t \in X_t$ is from the input data. The architecture as a whole relies on operator log Σ exp, for which there exists efficient optimals (oracles) of both the value of the operator and the gradient: $\nabla$ (log Σ exp)=softmax.

EXPERIMENTAL RESULTS

An example dataset that may be used for training the neural CRF model of the trajectory estimation system is a publicly available dataset described by M. Kubicka et al., "Dataset for testing and training of map-matching algorithms", in: 2015 IEEE Intelligent Vehicles Symposium (IV). June 2015, pp. 1088-1093, which presents an annotated open dataset specifically designed for map matching.

The Kubicka dataset contains 100 tracks (sequences) of varying length (5-100 km) with a sampling rate of 1 Hz for a total of 247251 trace points and 2695 km of cumulated tracks. A basic map is provided with each track. The tracks come from various parts of the world, thus ensuring some diversity in the dataset.

The neural CRF model may be trained at 120 seconds sampling rate, using 3-fold cross-validation. A metric that may be used is based on a comparison of the predicted path and the ground truth path. It is defined as the length of the segments incorrectly predicted (segments in the prediction but not in the ground truth), added to the length of the segments missed by the prediction (segments in the ground truth but not in the prediction), divided by the total length of the ground truth path. It may be seen as a type of error count normalized by the length of the route. Unlike simple accuracy of the road segment selection (just checking whether the selected road segment is present in the ground truth), this measure has the advantage of focusing on the object of interest, i.e. the whole trajectory of the moving object. This makes much more sense at low sampling rates.

When compared to state-of-the-art methods, the neural CRF model of the trajectory estimation system 2 is able to perform as well as previous methods, without requiring all the work that is required to define the scoring functions when using the state-of-the-art methods.

General

In accordance with the disclosed embodiments shown in FIGS. 1, 3 and 5, there is provided a system 2 for estimating a trajectory of an object 10 on a map 201. The system 2 includes a memory (or memory circuit) 12 for storing a sequence of traces (TN-TN+1) of the object 10 on the map 201; each trace in the sequence of traces defining (i) a position measured at a given time for the object 10 on the map 201; and (ii) accuracy information (RN-RN+1) that defines a measure of accuracy of the measured position on the map 201.

A map tile generation module 150 of system 2 that operates with processor 11: (i) pairs successive traces in the sequence of traces (T1,T2); each pair of successive traces comprising a first trace and a second trace corresponding to two successive positions in time in the sequence of traces; (ii) defines an area of accuracy 215 on the map using the accuracy information of the first trace and the second trace of each pair of successive traces (e.g., R1, R2); and (iii) segments the map into tiles 162 that includes the area of accuracy of the first trace and the second trace of each pair of successive traces.

A tile matrix computational module 152 of the system 2 that operates with processor 11: (i) determines a set of road segments (e.g., RS1, RS2, RS3, etc.) within the areas of accuracy of each pair of successive traces in the sequence of traces (e.g., T1, T2, T3); and (ii) for each segmented tile 162 (e.g., $TI_1$, $TI_2$, $TI_3$) associated with each pair of successive traces in the sequence of traces, (a) computes a set of images 204 representing a set of candidate paths of the object within the segmented tile; each candidate path in a set of candidate paths defining a different combination of road segments within the segmented tile; and (b) computes, using a neural network 203, a set of local path scores 208 representing a path score for each image in the set of images.

A road segment computation module 154 of the system 2 that operates with processor 11: (i) defines a sequence of sets of local path scores 211 with the set of local path scores 208 computed for each segmented tile associated with each pair of successive traces in the sequence of traces; and (ii) applies a neural graph model 206 to the sequence of sets of local path scores 211 to determine a most probable sequence of candidate paths that estimates the trajectory of the object 10 on the map 201.

A trajectory determination module 156 of the system 2 that operates with processor 11: (i) defines a sequence of sets of images 210 with the set of images 204 computed for each segmented tile associated with each pair of successive traces in the sequence of traces; and (ii) outputs the images from the sequence of set of images 210 defining the most probable sequence of candidate paths (representing trajectory 166 of object 10 on the map 110).

The foregoing description is merely illustrative in nature and is in no way intended to limit the disclosure, its application, or uses. The broad teachings of the disclosure may be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure may be implemented in and/or combined with features of any of the other embodiments, even if that combination is not explicitly described. In other words, the described embodiments are not mutually exclusive, and permutations of one or more embodiments with one another remain within the scope of this disclosure.

Each module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module. Each module may be implemented using code. The term code, as used above, may include software, firmware, and/or microcode, and may refer to programs, routines, functions, classes, data structures, and/or objects.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The systems and methods described in this application may be partially or fully implemented by a special purpose computer created by configuring a general purpose computer to execute one or more particular functions embodied in computer programs. The functional blocks, flowchart components, and other elements described above serve as software specifications, which may be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

It will be appreciated that variations of the above-disclosed embodiments and other features and functions, or alternatives thereof, may be desirably combined into many other different systems or applications. Also, various presently unforeseen or unanticipated alternatives, modifications, variations, or improvements therein may be subsequently made by those skilled in the art which are also intended to be encompassed by the description above and the following claims.

What is claimed is:

1. A method for estimating a trajectory of an object on a map, comprising:
    receiving a sequence of traces of the object on the map; each trace in the sequence of traces defining (i) a position measured at a given time for the object on the map, and (ii) accuracy information that defines a measure of accuracy of the measured position on the map;
    pairing successive traces in the sequence of traces; each pair of successive traces comprising a first trace and a second trace corresponding to two successive positions in time in the sequence of traces;
    defining an area of accuracy on the map using the accuracy information of the first trace and the second trace of each pair of successive traces;
    segmenting the map into tiles that includes the area of accuracy of the first trace and the second trace of each pair of successive traces;
    determining a set of road segments within the areas of accuracy of each pair of successive traces in the sequence of traces;
    for each segmented tile associated with each pair of successive traces in the sequence of traces, (i) computing a set of images representing a set of candidate paths of the object within the segmented tile; each candidate path in a set of candidate paths defining a different combination of road segments within the segmented tile; and (ii) computing, using a neural network, a set of local path scores representing a path score for each image in the set of images;

defining a sequence of sets of local path scores with the set of local path scores computed for each segmented tile associated with each pair of successive traces in the sequence of traces;

applying a neural graph model to the sequence of sets of local path scores to determine a most probable sequence of candidate paths that estimates the trajectory of the object on the map;

defining a sequence of sets of images with the set of images computed for each segmented tile associated with each pair of successive traces in the sequence of traces; and outputting the images from the sequence of set of images defining the most probable sequence of candidate paths.

2. The method of claim 1, wherein the neural graph model is a conditional random field (CRF) model.

3. The method of claim 2, further comprising superimposing the image with a candidate path in the set of candidate paths over its corresponding segmented tile on the map to represent a possible trajectory of the object on the map.

4. The method of claim 2, wherein the neural network is a convolutional neural network (CNN).

5. The method of claim 4, wherein the convolutional neural network takes as input a 2D image matrix of pixels for each set of images representing a set of candidate paths of the object within a segmented tile.

6. The method of claim 5, wherein the convolutional neural network takes as input a multichannel image for each set of images representing a set of candidate paths of the object within a segmented tile.

7. The method of claim 6, wherein a first channel of the multichannel image is a 2D image matrix of pixels.

8. The method according to claim 7, wherein a second channel and a third channel, respectively, of the multichannel image is a pixel-wise distance of a pixel in the 2D image matrix of pixels from the first trace and the second trace of its corresponding pair of successive traces.

9. The method of claim 2, further comprising scaling, cropping and rotating images in the set of images representing a set of candidate paths of the object to have the same dimensions and orientation as the segmented tile of the map to which the set of images correspond.

10. The method of claim 2, wherein the measure of accuracy of a measured position is given by a default value when a measured value is not available.

11. The method of claim 2, wherein the sequence of traces is received from a sensor attached to the object that measures successive positions of the object over a period of time.

12. The method of claim 2, wherein the accuracy information is given by a radius from the position measured at a given time for the object.

13. The method of claim 12, wherein the radius is used to define a disk as the area of accuracy around the position measured at a given time for the object.

14. An apparatus for estimating a trajectory of an object on a map, comprising:
one or more processors; and
memory including code that, when executed by the one or more processors, performs functions including:
receiving a sequence of traces of the object on the map; each trace in the sequence of traces defining (i) a position measured at a given time for the object on the map, and (ii) accuracy information that defines a measure of accuracy of the measured position on the map;

pairing successive traces in the sequence of traces; each pair of successive traces comprising a first trace and a second trace corresponding to two successive positions in time in the sequence of traces;

defining an area of accuracy on the map using the accuracy information of the first trace and the second trace of each pair of successive traces;

segmenting the map into tiles that includes the area of accuracy of the first trace and the second trace of each pair of successive traces;

determining a set of road segments within the areas of accuracy of each pair of successive traces in the sequence of traces;

for each segmented tile associated with each pair of successive traces in the sequence of traces, (i) computing a set of images representing a set of candidate paths of the object within the segmented tile; each candidate path in a set of candidate paths defining a different combination of road segments within the segmented tile; and (ii) computing, using a neural network, a set of local path scores representing a path score for each image in the set of images;

defining a sequence of sets of local path scores with the set of local path scores computed for each segmented tile associated with each pair of successive traces in the sequence of traces;

applying a neural graph model to the sequence of sets of local path scores to determine a most probable sequence of candidate paths that estimates the trajectory of the object on the map;

defining a sequence of sets of images with the set of images computed for each segmented tile associated with each pair of successive traces in the sequence of traces; and outputting the images from the sequence of set of images defining the most probable sequence of candidate paths.

15. The apparatus of claim 14, wherein the neural graph model is a conditional random field (CRF) model.

16. The apparatus of claim 14, wherein the neural network is a convolutional neural network (CNN).

17. The apparatus of claim 16, wherein the convolutional neural network takes as input a 2D image matrix of pixels for each set of images representing a set of candidate paths of the object within a segmented tile.

18. The apparatus of claim 17, wherein the convolutional neural network takes as input a multichannel image for each set of images representing a set of candidate paths of the object within a segmented tile, wherein a first channel of the multichannel image is a 2D image matrix of pixels, and wherein a second channel and a third channel, respectively, of the multi-channel image is a pixel-wise distance of a pixel in the 2D image matrix of pixels from the first trace and the second trace of its corresponding pair of successive traces.

19. The apparatus of claim 17, wherein the accuracy information is given by a radius from the position measured at a given time for the object, and wherein the radius is used to define a disk as the area of accuracy around the position measured at a given time for the object.

20. A method for estimating a trajectory of an object on a map, comprising:
receiving a sequence of traces of the object on the map;
pairing successive traces in the sequence of traces;
segmenting the map into tiles that includes an area of accuracy of the first trace and the second trace of each pair of successive traces;

for each segmented tile associated with each pair of successive traces in the sequence of traces, (i) computing a set of images representing a set of candidate paths of the object within the segmented tile; each candidate path in a set of candidate paths defining a different combination of road segments within the segmented tile; and (ii) computing, using a neural network, a set of local path scores representing a path score for each image in the set of images;

defining a sequence of sets of local path scores with the set of local path scores computed for each segmented tile associated with each pair of successive traces in the sequence of traces;

applying a neural graph model to the sequence of sets of local path scores to determine a most probable sequence of candidate paths that estimates the trajectory of the object on the map;

defining a sequence of sets of images with the set of images computed for each segmented tile associated with each pair of successive traces in the sequence of traces; and outputting the images from the sequence of set of images defining the most probable sequence of candidate paths.

* * * * *